United States Patent [19]
Mikolics et al.

[11] 3,927,531
[45] Dec. 23, 1975

[54] COOLING WATER SUPPLY SYSTEM WITH SELF ADJUSTING HYDRAULICS

[75] Inventors: Sándor Mikolics; Károly Ziegler; Viktor Homola, all of Budapest, Hungary

[73] Assignee: Novex Talalmanyfejleszto es Ertekesito Kulkereskedelmi Rt., Budapest, Hungary

[22] Filed: July 15, 1974

[21] Appl. No.: 488,773

[30] Foreign Application Priority Data
July 25, 1973 Hungary.............................. MI 541

[52] U.S. Cl...................... 60/690; 165/45; 137/566
[51] Int. Cl.²........................................... F01K 9/00
[58] Field of Search............... 137/566; 165/66, 45; 60/692, 690, 693

[56] References Cited
UNITED STATES PATENTS
1,982,305   11/1934   Hunicke............................ 165/66 X
3,105,472   10/1963   Jasper............................. 137/566 X

*Primary Examiner*—Alan Cohan
*Attorney, Agent, or Firm*—Karl F. Ross; Herbert Dubno

[57] ABSTRACT

A power plant having a condenser is provided with a self-adjusting water-feed system in which a first pump draws water from the primary source (e.g. a stream, lake or reservoir), feeds the water through a passage. A second pump draws the cooling water from the passage and supplies it to the condenser, and the water from the condenser flows through another passage in which the flow is adjusted by a level control. A bypass connects the two passages so that flow between them to adjust the temperature is possible solely by control of the relative levels at the source and the ultimate receptacle.

4 Claims, 2 Drawing Figures

U.S. Patent    Dec. 23, 1975    3,927,531
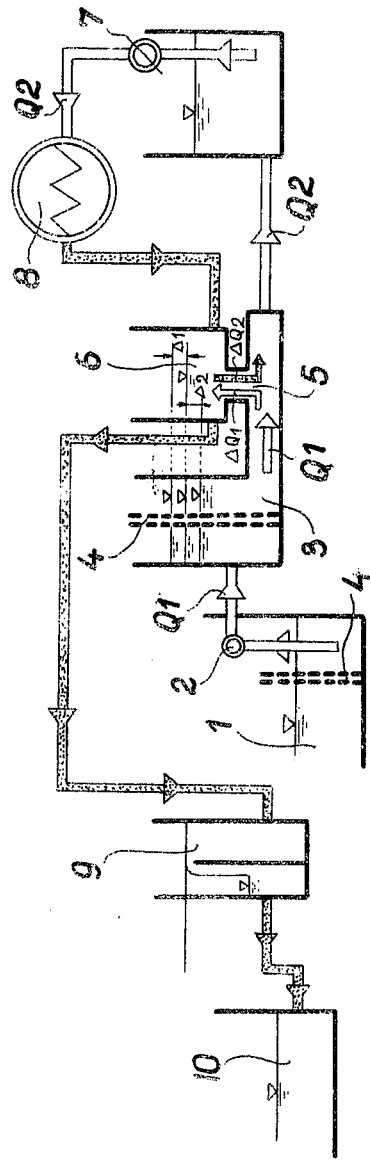
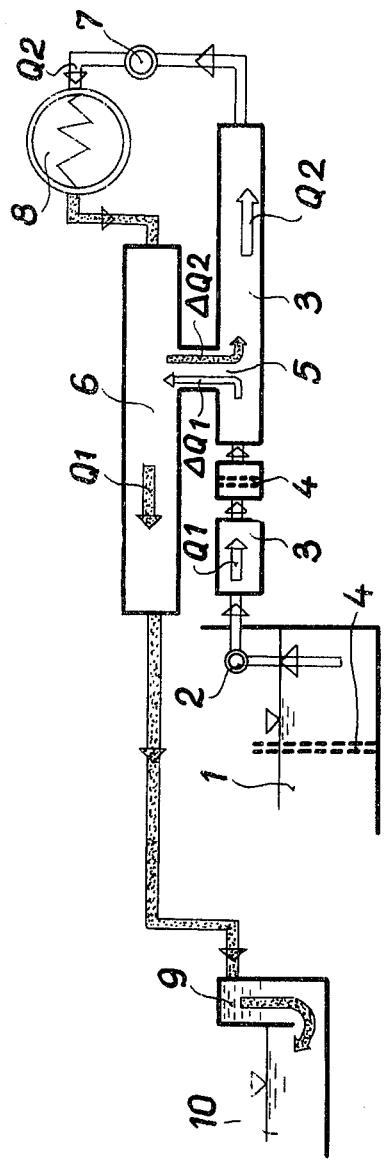

COOLING WATER SUPPLY SYSTEM WITH SELF ADJUSTING HYDRAULICS

BACKGROUND OF THE INVENTION

Large-scale industrial enterprises, above all freshwater-cooled thermal power stations, necessitate the turnover and regulation of large cooling water quantities. The main characteristics of cooling water turnover, the control of which is indispensable, are as follows:

Provisions for water drawn from a natural water course, according to the fluctuating requirements of the plant, independently of the water level of the eventual breakdown of intake machines and filters.

Uniform control of the temperature, defreezing, and filtration of the cooling water, in conformity with the needs of the plant.

The above requirements can only be satisfied by complex structures, and facilities. The systems used so far could satisy the above needs generally by means of the following elements:

In case of breakdown of the intake pump or the filters auxiliary units or a reservoir were operated and, these being insufficient, the operation of the plant (e.g. thermal power station) was limited.

A rapid follow-up of the varying operational conditions was feasible only with complicated electro-mechanical devices and automatic equipment, or by the employment of a large number of operators.

Systematic adjustment of the inlet cooling water was impossible.

SUMMARY OF THE INVENTION

The solution according to the present invention is entirely different as compared to the hitherto known systems. Instead of the uncertain water-quantity measurements and consequently, of the complicated electro-mechanical controls, a system of free water surface is employed, without any mechanical device (sluices, locks, etc.), by making use of the self-adjusting properties of an hydraulic system.

An essential feature of the process consists in that the hydraulic self-adjusting connection of the hot and cold water ducts can be ensured even with closed pipeline system.

a. The invention provides: Cooling water intake from a stream, reservoir or lake, serving as the source of cooling water, and its transfer through the cooling circuit (i.e. through the ducts and channels to the condensers — and perhaps but not necessarily — through filters inserted therein, further through the condensers, and the ducts, pipes, and other structures leading to the warmed-up cooling water to the receptor), by two-stage pumping.

b. In the cooling water system, in the section between the two pumping points mentioned under (a), that is, between the two pumping stages, the cooling water delivery pipe or channel running to the condensers is operatively connected at one point in a permanent manner with the section mentioned under (c), that is, with the section of the duct or pipe delivering the warmed-up cooling water, downstream of the condenser but before the point of return to the receptor.

c. In the duct or pipe delivering the warmed-up cooling water from the condenser to the receptor, in the section including the connection contained under (b), either the water level is maintained within suitable limits (by a spillway, overflow, or other water level control equipment of a water permeability depending on the highwater level) or, in the case of a closed duct or pipe being under full-section pressure, a constant filled-up section is provided for, independently of water level of the receptor and of the quantity of the flowing hot water (by ensuring the constant water coverage of the closed pipe end, which can be maintained also by the prevailing water level of the receptor).

The above layouts have the following advantages:

They provide for a water quantity meeting the prevailing water demand of pumps operating in the second pumping stage (even if this water demand varies rather suddenly), independently of the water quantity drawn in the first stage.

The temperature of the cooling water reaching the condensers can be adjusted to that of the cooling water entering the first pumping stage or to any required higher temperature by controlling the water delivery of the pump or pumps operating in the first pumping stage.

The desired operational conditions of the cooling water system can be checked by temperature measurements at suitable points of the system.

The operational safety can be considerably increased if the pumps operating in the first stage and the filters or the entire system operate with a common duct of pipe.

Since the system will rapidly compensate the variations of the water demand, the delivery capacity of the ducts can be optimally exploited.

A comparison of the new system and previous solution reveals that:

the hydraulic self-compensation without moving parts highly increases the operational safety;

in spite of unforeseen or deliberate changes (e.g. pump breakdown, clogged filter, change-over to the reserve, etc.) the water cycle will continue smoothly, and the change in question will be manifested only in a delayed slight modification of the water temperature;

the inspection duties and the number of control staff are greatly reduced;

as against the hitherto usual annual minor repairs, and quinquennial general overhaul, the repair and maintenance stand-still is simplified even for the mechanical equipment to a fast cleaning every five year and to an overhaul only at 20 to 50-year interval, usual with concrete structures;

the effects reduced to a slight temperature variation result in considerable financial advantages easy to express numerically; and the possibility for the adjustment of the cooling water temperature increases the operational stability of the modern giant but sensitive turbines and other industrial establishments without any additional inplant facilities, whereby significant investment savings are feasible.

BRIEF DESCRIPTION OF THE DRAWING

FIG. 1 is a flow diagram of a first embodiment of the invention; and

FIG. 2 is a flow diagram of a second embodiment.

SPECIFIC DESCRIPTION

In FIG. 1 we show a primary source of cooling water 1, such as a stream, canal, reservoir or lake, which supplies the intake side of a first pump 2 through filters which have been diagrammatically represented at 4.

The outlet side of the pump 2 is connected to a cooling water inlet passage 3 having a vertical column at its inlet side in which a liquid head can be maintained which varies from a median position by $\Delta_1$ and $\Delta_2$, respectively. Filters 4 are provided between the outlet of the pump and the remainder of the cooling water channel. The cooling water flow delivered by the pump 2 has been represented as $Q_1$ and corresponds to the cooling water flow through the inlet channel 3.

From the inlet channel 3, the cooling water is drawn at a rate $Q_2$ by a pump 7 from a supply reservoir whose level determines the level of the liquid in the column of inlet channel 3. The second pump 7 feeds the condenser 8 of the power plant.

The warm-water effluent from this condenser, generally at a rate $Q_2$ flows into a pressurized warm-water duct 6 which is under a head determined by the warm-water level control 9 at the downstream side of this channel. Element 9 has an overflow or the like which regulates the level of liquid in the channel 6 and hence the pressure therein. From the warm-water level control 9, the effluent from the condenser flows into the discharge receptacle 10 which may be the same source of water at a location downstream from the intake of pump 2.

From FIG. 1 it will be apparent that it is possible to maintain a balance $Q_1 = Q_2$ whereby the flow across the bypass 5 between the cooling channel 3 and the warm-water channel 6 is zero. If it is desired to increase the temperature of the cooling water supplied to the condenser 8, pump 7 is accelerated relative to pump 2 so that the quantity $Q_2$ will be greater than $Q_1$ and warm water will flow as represented by $\Delta Q_2$ from the channel 6 into the channel 3, driven by the head difference $\Delta_2$. Of course, when cooler water is required at the discharge side, pump 2 may be acclerated to raise the head in channel 3 by $\Delta_1$, thereby driving a flow $\Delta Q_1$ from the cooling channel 3 into the warm water channel 6.

In FIG. 2 similar conditions apply and hence corresponding reference numerals have been used for the several parts. The sole difference, of course, is that the channels 3 and 6 are here closed passages so that the pressure developed in them is the confining pressure against which the respective pumps 2 and 7 operate.

INCRIPTION

/A/ Gravity alternative

Operation:
if $Q_1 = Q_2$, then $\Delta_1 = \Delta_2 = 0$, and, therefore,
$\Delta Q_1 = \Delta Q_2 = 0$
if $Q_1 > Q_2$, then $\Delta_1 > 0$ and, therefore
$\Delta Q_1 = Q_1 - Q_2 > 0$ and $\Delta Q_2 = 0$
if $Q_1 < Q_2$, then $\Delta_2 > 0$ and, therefore,
$\Delta Q_2 = Q_2 - Q_1 > 0$ and $\Delta Q_1 = 0$
allando = constant 1. Stream, canal, reservoir or lake serving as basis of the cooling water supply
2. First pumping stage (pump)
3. Cooling water inlet channel or duct
4. Spaces of eventually employed filters
5. Connection between 3 and 6
6. Channel or duct discharging the warmed-up cooling water
7. Second pumping stage (pump)
8. Condensor
9. Equipment regulating the hot water level (spillway)
10. Receptor /B/ Alternative under pressure Operation:
if $Q_1 = Q_2$, then $\Delta Q_1 = \Delta Q_2 = 0$
if $Q_1 > Q_2$, then $\Delta Q_1 = Q_1 - Q_2$ and $\Delta Q_2 = 0$
if $Q_1 < Q_2$, then $\Delta Q_2 = Q_2 - Q_1$ and $\Delta Q_1 = 0$ 1. Stream, canal, reservoir or lake serving as basis of the cooling water supply
2. First pumping stage (pump)
3. Closed cooling water inlet channel or duct under pressure
4. Spaces of eventually employed filters
5. Connection between 3 and 6
6. Closed channel or duct under pressure, discharging the warmed-up cooling water
7. Second pumping stage (pump)
8. Condenser
9. Inlet providing for a constant filled section of the cold and hot channels and ducts
10. Receptor.

What we claim is:

1. A method of operating a cooling supply system for the condenser of a power plant which comprises the steps of:

pumping cooling water from a source through a cooling water channel at a first location;

pumping water from said channel at a second location through said condenser and through a warm-water channel;

bypassing said channels into one another; and controlling the flow of water from one channel into the other at the bypass solely by the relative rates pumped at said location.

2. The method defined in claim 1, further comprising the step of maintaining a constant water head in said warm-water channel.

3. A cooling water system for the condenser of a power plant, comprising:

a source of cooling water;

a first pump connected to said source for displacing cooling water at a first rate;

a cooling water channel connected to said first pump for conducting the cooling water therefrom;

a second pump drawing water from said cooling channel and pumping it through said condenser at a second rate;

a warm-water channel connected to said condenser for conducting warm water therefrom; and a valveless bypass interconnecting said channels for permitting selected flow from one of said channels to the other in either direction through said bypass in dependence upon the relative rates.

4. The system defined in claim 3 wherein said cooling water channel comprises a duct having an inlet side and an outlet side, means forming a column adapted to sustain a water head at said inlet side, said first pump being connected to said duct at said inlet side, said second pump being connected to said duct at an outlet side thereof and said bypass being connected to said duct intermediate said inlet and outlet sides; a supply reservoir is provided between the intake of said second pump and said outlet side of said duct for automatic maintenance of the same water level in said reservoir as in said column; said warm-water channel is provided with a level-maintaining device for maintaining a constant water level therein.

* * * * *